United States Patent [19]

Watson

[11] 3,855,578

[45] Dec. 17, 1974

[54] HOLOPHONE INFORMATION STORING AND/OR PROCESSING DEVICE

[75] Inventor: Christopher John Hamilton Watson, Oxford, England

[73] Assignee: United Kingdom Atomic Energy Authority, London, England

[22] Filed: Mar. 8, 1971

[21] Appl. No.: 121,920

[30] Foreign Application Priority Data

Mar. 11, 1971 Great Britain............... 11777/70

[52] U.S. Cl......................... 340/173 NC, 340/172.5

[51] Int. Cl........................................... G11c 13/00

[58] Field of Search................................ 340/173 NI

[56] References Cited

UNITED STATES PATENTS

| | | | |
|---|---|---|---|
| 2,887,673 | 5/1959 | Hahn | 340/173 NI |
| 3,215,988 | 11/1965 | Clapp | 340/173 NI |
| 3,324,461 | 6/1967 | Kaplan | 340/173 NI |

*Primary Examiner*—Terrell W. Fears

*Attorney, Agent, or Firm*—Larson, Taylor & Hinds

[57] ABSTRACT

Certain natural physical systems, such as a collisionless plasma excited by a sequence of spatially periodic electrostatic pulses, or a material possessing net nuclear or electron spin in an external magnetic field, are adapted for information processing, for example for searching a mass of stored information for the presence of information related to a particular portion of information, or "cue."

7 Claims, 3 Drawing Figures

HOLOPHONE INFORMATION STORING AND/OR PROCESSING DEVICE

BACKGROUND OF THE INVENTION

The invention relates to a holophone information storing and/or processing device.

The holophone is the temporal analogue of the holograph, in the sense that it stores information, presented to it in the form of a time-sequence, in a temporally non-local manner, just as a holograph stores information, presented in the form of a spatial array, in a spatially non-local manner.

Theoretical properties of a holophone viewed as a black box are discussed by D. J. Willshaw and H. C. Longuet-Higgins in Machine Intelligence No. 4 (1969), page 349.

Three properties mentioned of particular interest are as follows:

1. If an input signal is recorded in the holophone and a part of this signal re-injected, a signal emerges which is the continuation of the input signal from the part re-injected.
2. If several signals are recorded in the holophone, an input cue from one of the signals will evoke the continuation of that one signal.
3. The holophone may be used for detecting the occurrence of a given segment in the course of a long signal. For this, the segment of interest is recorded on the holophone followed by a strong pulse. The long signal is then played into the holophone when a pulse emerges from the holophone immediately after an occurrence of the recorded segment.

An implementation is described in the form of a bank of narrow-pass filters connected in parallel to an input channel, and also connected in parallel, through amplifiers of variable gain, to an output channel.

However, this implementation does not at present appear to be a plausible practical device for recording information sequences of useful length at reasonable speed and cost.

The present invention is based upon the appreciation that certain natural physical systems (hereinafter referred to as holophone materials) exhibit physical phenomena capable of holophonic behaviour in response to appropriately generated input signals. Specifically, one example of such a holophone material is a collisionless plasma, excited by a sequence of spatially periodic electrostatic pulses. Other examples of holophone materials are materials possessing net nuclear spin, such as water or paraffin, or materials possessing unpaired electron spin, in association with means for applying radiofrequency magnetic field pulses at a frequency close to the nuclear or electron (as the case may be) spin resonance frequency in an external magnetic field.

A further appreciation, upon which the present invention is based, has emerged from analysis showing that the general principles (1) to (3) above apply to a series of pulsed signals which are coded, for example, in a binary coding system, and that, whilst the noise problem (as discussed by Willshaw and Longuet-Higgins in the above-mentioned article) is present, the output signals are susceptible of "cleaning up."

SUMMARY OF THE INVENTION

The invention provides a holophone information storing and/or processing device comprising generator means for generating coded signal pulses, representing information, in a form for causing a systematic disturbance to the motion of elements within a holophone material, which elements possess or are caused to acquire a natural periodicity in their motion, control means operative to cause the generator means to supply in succession to the holophone material a series of pulses representing a store of information and a series of pulses representing a portion of information, and means for detecting subsequent echo waveforms emitted by the holophone material.

In one arrangement according to the invention the holophone material comprises a collisionless plasma confined within a plasma confinement system such as has been developed in the context of research into thermonuclear fusion. As discussed in more detail below, the confined plasma for this application as a holophone material differs from that involved in thermonuclear fusion research in being desirably a plasma at as low a temperature as is practicable. In this arrangement the generator means preferably comprises a matching unit for converting signal pulses into electrostatic pulses in the plasma, each of which electrostatic pulses has a spatial periodicity within the plasma, a stored signal source, such as a computer type of backing store, of coded signal pulses representing stored information, a cue signal source of coded signal pulses representing a portion of information, and means for connecting the stored signal source and the cue signal source to the matching unit to supply thereto their respective series of signal pulses in succession.

In another arrangement according to the invention the holophone material comprises a material possessing nuclear or electron spin. In this case the generator means preferably comprises a matching unit for converting signal pulses into radiofrequency electromagnetic pulses, a stored signal source, such as a computer type of backing store, of coded signal pulses representing stored information, a cue signal source of coded signal pulses representing a portion of information, means for connecting the stored signal source and the cue signal source to the matching unit to supply thereto their respective series of signal pulses in succession, there being provided means for applying a fixed external magnetic field to the holophone material, the frequency of the electromagnetic pulses generated by the matching unit being close to the nuclear or electron (as the case may be) spin resonance frequency in the said external magnetic field.

Preferably the aforesaid means for detecting subsequent echo waveforms emitted by the holophone material includes a clarifier for improving the observed signal to noise ratio. In one form of the clarifier comprises means for detecting the sign of the signal output from a monitoring unit, which detects the output signals from the holophone material.

The invention further provides a holophone information storing and/or processing device comprising, as holophone material, a material possessing nuclear or electron spin, means for applying a fixed external magnetic field to the holophone material, generator means for generating signals, representing information, in a form of systematically disturbing the alignment of the nuclear or electron spins with the said external magnetic field, and means for detecting echo waveforms emitted by the holophone material. In operation a first signal representing information is supplied to the holophone material followed by a second signal to be compared with the first signal. If the second signal contains a portion of the first signal, an echo will be emitted from the holophone material, which echo corresponds with the continuation of the first signal from the portion represented by the second signal. The application of this arrangement to, for example, speech recognition will thus be appreciated.

BRIEF DESCRIPTION OF THE DRAWINGS

Specific constructions of device embodying the invention will now be described by way of example with reference to the accompanying drawings, in which.

DESCRIPTION OF PREFERRED EMBODIMENTS

Figures 1, 2, 3:
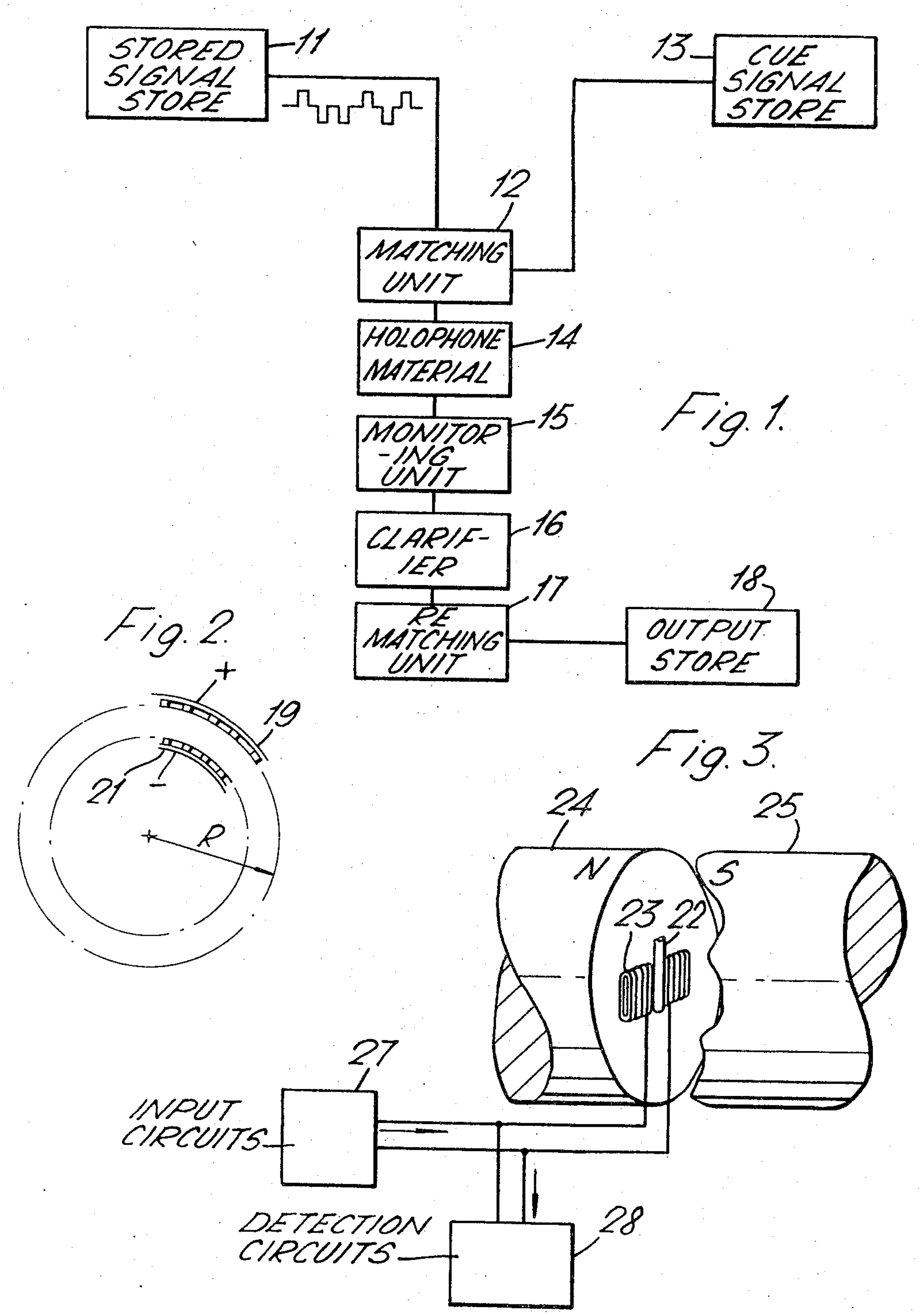
FIG. 1 is a block diagram of essential elements of a device.
FIG. 2 is a diagrammatic representation of a part of one form of device.
FIG. 3 is a diagrammatic representation of a part of another form of device.

Two forms of holophone material are described in these examples: a collisionless plasma and a nuclear spin material. It will be appreciated that a system employing electron spin material may be derived from its close analogy with the nuclear spin system.

In both the systems discussed the time during which the holophone retains the information fed into it is short. In the plasma system the limit is set by the means collision time of the electrons in the plasma and the time after which the electrons are lost from the confined plasma to the surrounding walls. Both of these times must be longer than the time during which the holophone is required to remember a given information sequence. In the nuclear spin system, the limit is set by the relaxation time or the loss of spin phase coherence due to self-diffusion of molecules in liquids.

Whilst the holophone materials of these examples do store information, the period is so short that the materials are used in conjunction with a backing store and the holophone device may therefore be regarded as a signal processing system.

The technique may best be described with reference to FIG. 1, supposing that it is desired to search a mass of stored information for presence of information related to a particular portion of information or "cue."

The mass of stored information is stored in a stored signal store 11, which may conveniently comprise a suitable computer store. This information is fed out in a sequence of binary coded pulses to a matching unit 12. The matching unit converts the store output pulses into pulses suitable for injection into the holophone material 14 for exciting its holophonic response. Immediately after completion of this operation, a cue signal is fed into the matching unit 12 from a cue signal store 13. If any part of the cue signal corresponds with a part of the stored information, echo signals will emerge from the holophone material 14 which correspond to the whole of the stored information signals starting from the first point of correspondence with the cue signal.

The echo signals are detected by a monitoring unit 15 and fed via a clarifier 16 and rematching unit 17 to an output store 18.

Theoretical analysis indicates that the echo signal is very noisy, but the form of the echo signal equation indicates possiblities for cleaning the signal and it has been found that a dramatic improvement in signal to noise ratio may be achieved simply by attaching significance to the sign of the output echo signal and not its magnitude. Assuming a total of 100 signal pulses have been injected of which 10 are cue signals, this technique for improving the signal to noise ratio leads to a substantial agreement between the recorded and playback sequences. It is envisaged that more sophisticated "cleaning up" procedures would improve playback clarity further.

The rematching unit 17 performs a function which is the inverse of the matching unit 12.

It will thus be seen that the holophone system proposed provides a device capable of searching information. A significant advantage which the device provides is the ability to recognise incomplete information or information containing inaccuracies. The device is also fast. There need be no significant delay between feeding in a cue signal and emergence of the echo response. Whilst it is true that the whole of the information to be searched has to be fed into the holophone, this is a comparatively straightforward operation even with a binary digital pulse code system. Existing technology would permit this operation at a speed in excess of 100 binary bits per microsecond. Furthermore, when it is known that a certain section of stored information is to be searched, it is possible to start transferring the stored information into the holophone device a short time before the cue signal is ready. In fact, the stored information could be repeatedly injected into the holophone device whilst a series of searching operations are carried out upon it.

It will be appreciated, however, that the device is capable of other forms of information processing such as for speech recognition, or for content addressable computer memories. With the collisionless plasma system, the information is required in a pulse code modulated form, but conversion of speech or written test to such a form is a routine procedure and computer-stored information is already conventionally in binary digital form. The information may also be in pulse code modulated form in the nuclear or electron spin system, but this system can also operate upon continuous wave signals.

In the example employing a collisionless plasma as holophone material, the electrical signal pulses forming the output from the backing stores (11, 13) control the excitation of electrostatic waves in an ionised plasma. The waves should be essentially plane standing waves such that the electric field $E(x,t) = R(t) \sin kx$ where $2\pi/k \equiv \lambda$ is the wavelength of the wave and $R(t)$ is the amplitude of the wave at time $t$ as determined by the electrical pulse sequence applied to the input matching unit 12 of the holophone device.

Thus, in this example, the motion of electrons in the plasma is disturbed by the imposed electrostatic standing wave pattern and the electrons are caused to acquire periodicity in their motion by the spatial periodicity of the standing wave pattern itself.

The dimensions, temperature and density "$n$" of a suitable plasma are fairly widely variable. The constraints are as follows:

The Debye length $$\lambda_D = (4\pi n e^2/kT)^{-1/2}$$

should desirably be comparable with or large compared with the wavelength λ. This reduces collective plasma effects which would mask the plasma echoes. In the expression "$e$" is the electronic charge, "$k$" Boltzmann's constant, and "T" the effective absolute temperature of the plasma.

Under this condition, to secure sharp output pulses from the holophone, the temperature of the plasma must be sufficiently high for the relation $$k\bar{V}\ \Delta t >> 1$$

to be satisfied where $\bar{V}$ is the mean velocity of the electrons at the temperature T and $\Delta t$ is the time interval between pulses.

As stated above, the mean collision time $\tau_c$ for electrons in the plasma and the time $\tau_l$ after which the electrons are lost from the plasma to the surrounding walls must both be longer than the time $\tau_m$ during which it is desired to use the holophone to remember a given information sequence.

This latter requirement suggests that one should seek the shortest possible interval $\Delta t$ between pulses. However, $\Delta t$ has to be substantially in excess of the duration $\delta t$ of each pulse, which itself must also satisfy the requirement $$k\bar{V}\ \delta t << 1$$

in order that the pulses appear instantaneous to the electrons. Conveniently one requires $$\delta t < 1/\mathbf{10}\ \Delta t$$

Against this there are, of course, practical limits on the extent to which $\delta t$ can be reduced.

Assuming the lowest feasible plasma temperature is $T_e$ of the order of 0.5 eV, and taking for $\Delta t$ the shortest time consistent with the constraints discussed above, the maximum number of pulses which could be fitted into a straight plasma would be about 60, if the electrons are assumed lost when they arrive at the longitudinal ends of the plasma within the vacuum vessel. For this reason, for most applications, it is necessary to employ a toroidal plasma of small perimeter (<30 centimetres) or to arrange for electrons to be efficiently reflected back into the plasma before they reach the longitudinal end walls of the vacuum vessel. Such reflection can be readily provided using appropriate electric fields or magnetic mirror fields. In a known forms of straight plasma confinement system, called a Q machine, the longitudinal end walls comprise metal heated to white heat for ionising gas which is directed onto them. Confinement in the transverse directions is provided by a longitudinal magnetic field. It so happens that, in this system, electric fields exist near the end walls which reflect back electrons into the plasma. This serves to increase the effective length of the straight plasma for the holophone application herein proposed. With this arrangement, however, provision has to be made to avoid the information becoming confused within the system by the end reflections. One way of making such provision is to arrange for the plasma length between the reflection planes to be an integral multiple of the wavelength λ, as herein defined.

The length of the plasma column is related to the presently obtainable lower limit for $\delta t$ (of the order of $10^{-9}$ seconds) and the wavelength of the electrostatic pertubation. The following example gives a practical set of parameters consistent with the above constraints.

FIG. 2 shows diagrammatically a plasma containment toroid of major radius R about 3 centimetres and desirably containing the plasma to a minor radius of 3 millimetres with a toroidal magnetic field of 5 kiloGauss (approximately).

Plasma density is desirably in the range $n = 10^8$–$10^{10}$ particles/cm$^2$. Too high a density reduces the mean collision time and enhances undesirable collective effects, whilst with too low a density the output signals are too weak.

Summarising, the following approximate design parameters are consistent with the above:

| | | | | |
|---|---|---|---|---|
| $k \doteq 6\ cm^{-1}$ | (i.e. | $\lambda$ | $\doteq$ | 1 cm) |
| $\bar{v} \doteq 5.10^7$ cm/sec | (i.e. | $T_e$ | $\doteq$ | 0.5 eV) |
| $\delta t \doteq 10^{-9}$ sec | (i.e. | $k\bar{v}\delta t$ | $\doteq$ | 1/3) |
| $\Delta t \doteq 10^{-8}$ sec | (i.e. | $k\bar{V}\Delta t$ | $\doteq$ | 3 ) |
| $n \doteq 10^8\ cm^{-2}$ | (i.e. | $\omega_p$ | $\doteq$ | $5.10^8$, |
| | | $k\lambda_D$ | $\doteq$ | 0.6) |

The confinement system must be such as to allow all particles to circulate along approximately parallel magnetic field lines and must have a confinement time greater than the maximum time for which the holophone device is to be used in one operation.

To generate the desired electrostatic waves in the plasma, the matching unit 12 adjusts the amplitude of the output pulses from the backing store for application to a digital line indicated diagrammatically at 19, 21 in FIG. 2.

In practice, the digital line will comprise teeth which are more closely spaced and extend closer to the minor axis of the vessel than is indicated by 19, 21 in the diagrammatic FIG. 2. That is, the structure will have the appearance in cross-section of a comb.

In an alternative arrangement, the matching unit generates pulses of radiofrequency electromagnetic signals which are used to create a spatially periodic standing wave which sets up a periodic quasi-potential within the plasma which operates in a manner exactly analogous to a spatially periodic electrostatic pulse. This possiblity is explained in an article by Motz and Watson in Advances in Electronics, Volume 23.

The monitoring unit 15 operates by detecting radiofrequency scattering off from the periodic density variation in the plasma. Alternatively the monitoring unit 15 may detect changes in induced charge upon the digital line 19, 21. In this example employing a plasma as holophone material, the monitoring device has to distinguish cyclic waveform pulses (that is pulses having a complete cycle with a positive phase and a negative phase) which are initially positive going from cyclic waveform pulses which are initially negative going.

FIG. 3 illustrates part of the apparatus for the example in which the holophone material is a material possessing nuclear spin. The sample of material is contained in a vessel 22 supported between coil windings 23, which are adapted to impose radiofrequency magnetic field signals upon the specimen.

The vessel 22 and coil windings 23 are supported as a whole between pole pieces 24, 25 of a large electromagnet which provides a uniform steady magnetic field, perpendicular to that of coil windings 23, for polarising the nuclear magnetic moments prior to injection of the signal pulses.

This form of apparatus, and the equipment for driving it, are substantially conventional for experimental measurements of nuclear magnetic moments. For this example, however, the drive circuits are modified to inject, into the coil windings 23, radiofrequency pulses of duration $\delta t$ and corresponding to the binary digital pulses supplied from the backing stores (11, 13). The pulse duration $\delta t$ is such that $$\gamma H \delta t << 1$$

where $\gamma$ is the nuclear gyromagnetic ratio and H is the magnetic gyrofrequency.

The frequency of the pulsed signals is required to be close to the mean gyrofrequency for spins in the sample.

Echo signals are detected by the current they induce in the coil windings 23. The input leads to the coil windings 23 are shown branched at 26 for connection to input and detection circuits indicated diagram atically at 27 and 28 respectively.

Whilst any material, such as water or paraffin, possessing net nuclear spin may be employed, for applications in which the holophone device is required to store information for as long as possible it will be desirable for the material to have a long relaxation time and weak self-diffusion.

A system employing material with unpaired electron spin will be closely comparable with the nuclear spin system, except that a different value of mean spin gyrofrequency will be involved.

Suitable systems are, for example:

1. a paramagnetic spin system such as $Ce^{3+}$ in lanthanum magnesium nitrate and described by J. A. Cowen and D. E. Kaplan in Physical Review, Vol. 124, No. 4, November 1961;
2. a ferromagnetic spin system such as yttrium iron garnet described by D. E. Kaplan in Physical Review Letters, Vol. 14, No. 8, February 1965;
3. a semiconductor spin system such as lithium or phosphorus doped silicon described by J. P. Gordon and K. D. Bowers in Physical Review Letters, Vol. 1, No. 10, November 1958.

In the nuclear spin and electron spin systems the disturbance to the motion of the spinning elements is caused by the pulsed radiofrequency signals. The natural periodicity in the motion is provided by the spin gyro-motion itself.

The invention is not restricted to the details of the foregoing example. For instance a system employing plasma cyclotron echoes may be used as the holophone material. For this, a plasma is disturbed by radiofrequency pulses close to the cyclotron frequency of the plasma in its confining magnetic field. The echo phenomenon in this case is somewhat similar to that of the nuclear or electron spin systems.

In alternative systems the plasma may be confined in an electrostatic potential well, or a magnetic mirror system. In these cases, a periodic grid structure such as 19, 21 in FIG. 2 is not required because the plasma particles already possess a natural periodicity in their motion.

Thus, a simple system of end plates and an intermediate grid can be employed for injecting the signal pulses. In these systems, a necessary condition is that the frequency of oscillation of particles in the well is dependent upon the energy of the particles. The apparatus for such alternative systems may be based upon that described by Alfred Y. Wong and Robert J. Taylor in Physics Review Letters, Volume 23, page 958, 1969, "Trapped particles and echoes" or the "Magnetic Mirror System" of Chuan Sheng Liu and Alfred Y. Wong in Physics Review Letters, Volume 25, page 702, 1970.

A further possible alternative system comprises a photon echo system in which optical transitions in a system of atoms are induced by pulses of laser light, employing the techniques described by N. A. Kurnit, I. D. Abella and S. R. Hartmann in Physics Review Letters 13, page 567 (1964).

A further possible alternative system may be provided by a solid state plasma operating in an analogous manner to the gas plasma system described above.

I claim:

1. A holophone information storing and processing device comprising generator means for generating coded signal pulses, representing information, in a form for causing a systematic disturbance to the motion of elements within a holophone material, which elements possess or are caused to acquire a natural periodicity in their motion, control means for controlling the generator means, said control means being operative to cause said generator means to supply to the holophone material a series of coded signals representing a store of information and said control means being further operative to cause the generator means subsequently to supply to the hologram material a series of coded signal pulses representing a portion of information corresponding to a portion of said store of information, and means for detecting subsequent echo waveforms emitted by the holophone material.

2. A holophone information storing and processing device as claimed in claim 1, wherein the holophone material comprises a collisionless plasma confined within a plasma confinement system.

3. A holophone information storing and processing device as claimed in claim 2, wherein the generator means comprises a matching unit for converting signal pulses into electrostatic pulses in the plasma, each of which electrostatic pulses has a spatial periodicity within the plasma, a stored signal source of coded signal pulses representing stored information, a cue signal source of coded signal pulses representing a portion of information, and means for connecting the stored signal source and the cue signal to the matching unit to supply thereto their respective series of signal pulses in succession.

4. A holophone information storing and processing device as claimed in claim 1, wherein the holophone material comprises a material possessing nuclear or electron spin.

5. A holophone information storing and processing device as claimed in claim 4, wherein the generator means comprises a matching unit for converting signal pulses into radiofrequency electromagnetic pulses, a stored signal source of coded signal pulses representing stored information, a cue signal source of coded signal pulses representing a portion of information, means for connecting the stored signal source and the cue signal source to the matching unit to supply thereto their respective series of signal pulses in succession, there being provided means for applying a fixed external magnetic field to the holophone material, the frequency of the electromagnetic pulses generated by the matching unit being close to the nuclear or electron (as the case may be) spin resonance frequency in the said external magnetic field.

6. A holophone information storing and processing device as claimed in claim 1, wherein the means for detecting subsequent echo waveforms emitted by the holophone material includes a clarifier for improving the observed signal to noise ratio.

7. A holophone information storing and processing device as claimed in claim 6, wherein the clarifier comprises means for detecting the signal of the signal output from a monitoring unit, which detects the output signals from the holophone material.

* * * * *